2,895,950
COMPOSITIONS CONTAINING HYDROPEROXIDE POLYMERIZATION CATALYST AND ACRYLATE ACID DIESTER

Vernon K. Krieble, Hartford, Conn., assignor to The American Sealants Company, Hartford, Conn., a corporation of Connecticut No Drawing. Application November 27, 1957
Serial No. 699,209

27 Claims. (Cl. 260—89.5)

The present invention relates to a method of imparting novel anaerobic curing characteristics to polymerizable compounds having the following general formula:

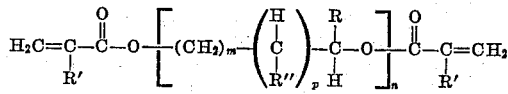

where R is a member selected from the class consisting of hydrogen, —CH$_3$, —C$_2$H$_5$, —CH$_2$OH, and

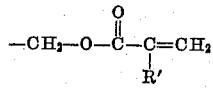

radicals, R' is a member selected from the class consisting of hydrogen, chlorine and methyl and ethyl radicals, R" is a member selected from the class consisting of hydrogen, —OH radical, and

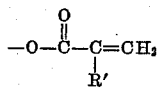

radical: m is an integer equal to at least 1, e.g. from 1 to 8 or higher, for instance, from 1 to 4, inclusive; n is an integer equal to at least 2, for example, from 2 to 20 or more, and p is one of the following: 0, 1.

Anaerobic curing characteristics may be defined as the property of a polymerizable compound to polymerize rapidly and spontaneously to the solid state upon the exclusion of air or oxygen from the compound. A principal novel feature of the compositions of the present invention is that, in addition to having anaerobic curing characteristics, the compositions have a long shelf life in the liquid state as long as contact with air is maintained. This property is particularly useful in the bonding or adhering of adjacent surfaces since the composition can be stored or permitted to stand in contact with air for extended periods of time without polymerizing, yet when it is deposited or placed between adjacent surfaces, the accompanying exclusion of air causes the composition to polymerize and form a strong bond. The foregoing compounds, as such, do not have anaerobic properties, which is to say that they will remain liquid over long periods of time when excluded from contact with air.

This application is a continuation-in-part of my prior applications Serial Number 556,766, filed December 19, 1955, now abandoned; Serial Number 530,878, filed August 26, 1955, now abandoned; and Serial Number 530,641, filed August 25, 1955, now abandoned.

It has been known heretofore that the polymerization of monomers of the foregoing type may be initiated by the addition of a small amount of benzoyl peroxide as a catalyst. Benzoyl peroxide is a compound formed by the chemical reaction of benzoyl chloride and sodium peroxide. Such a catalyst does not impart anaerobic curing characteristics to the monomers referred to and polymerization is not dependent upon the exclusion of air. In other words, when there is sufficient of the catalyst present to cause polymerization, polymerization either will proceed far too rapidly in the presence of air for a practical shelf life and/or will not proceed sufficiently rapidly when air is excluded to have any practical usefulness.

It also has been proposed in accordance with United States Patent 2,628,178 to form an anaerobic monomer from compounds having the above general formula by subjecting the compounds to the following essential conditions:

(a) Flow of oxygen must be adequate and continuous
(b) Stirring must be rapid
(c) The temperature should not exceed approximately 90° and
(d) The oxygenated product must be cooled to room temperature under oxygen flow with stirring.

Failure of any of these prior art requirements is stated to result in almost immediate gelation of the product accompanied by the sudden generation of a large quantity of heat. The resulting oxygenated monomer not only possesses anaerobic characteristics but, in fact, is so sensitive to any diminution of the oxygen or air supply as to require the continued passage of air or oxygen through the compound to prevent the same from polymerizing and, even then, the method sometimes goes out of control with resultant polymerization of the composition. A very serious practical problem with this kind of anaerobic monomer is the extreme difficulty of shipping and storing it, since continuous aeration is required.

An aim of the present invention is to provide a method of forming a composition in liquid form which will convert to a tough resin, i.e., undergo rapid polymerization at room or slightly elevated temperatures in the absence of air but at the same time, in contact with moderate amounts of air, will remain liquid for extended periods of time. A more particularly aim of the present invention is to provide a method of imparting anaerobic curing characteristics to compounds of the above general formula which does not require the introduction of oxygen or air streams either to impart the anaerobic characteristics or to prevent the resulting liquid anaerobic compound from converting to solid resin.

In accordance with the invention, anaerobic curing characteristics are imparted to unoxygenated compounds corresponding to the general formula:

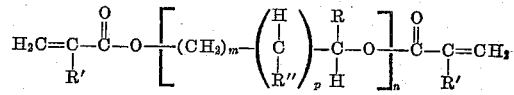

where R, R', R", m, n and p have the meanings given above, by adding thereto a small amount of a catalyst of the type hereinafter described and with or without the addition of a conventional accelerator. The term "unoxygenated" as used herein and in the claims refers to the unmodified monomers corresponding to the above formula as distinguished from the "oxygenated" monomers of U.S. Patent 2,628,178 which are prepared by passing oxygen through the monomer for an extended period of time. The ingredients may be mixed at ordinary room temperature and at a time which is well in advance of the actual use of the composition. So long as some air is present, which may be nothing more than a small layer of air in a properly shaped sealed container as of glass, or preferably a polyethylene or other container which permits the passage of air therethrough, the material will not polymerize for periods of time as long as one year or more. However, when the mixture is entirely excluded from contact with air, such as when the same is applied between adjacent surfaces such as between the threads of a threaded connection or between plates, etc., the material will rapidly polymerize and form a strong bond.

The time required to form such a bond upon the exclusion of air may be varied over a wide range by the proper selection of the particular materials added and the amount thereof, and by varying the temperature during polymerization. If desired, the setting time when air is excluded may be reduced to as little as three minutes or less, or may be extended to the range of an hour or so where rapid setting is not essential or desirable.

The starting materials which may be utilized in accordance with the invention are those corresponding to the above general formula and include, for example, diethylene glycol dimethacrylate, triethylene glycol dimethacrylate, tetraethylene glycol dimethacrylate, dipropylene glycol dimethacrylate, poleythylene glycol dimethacrylate, di-(pentamethylene glycol) dimethacrylate, tetraethylene glycol diacrylate, tetraethylene glycol di-(chloroacrylate), diglycerol diacrylate, and diglycerol tetramethacrylate. The foregoing compositions need not be in the pure state but may comprise commercial grades of such polymerizable materials in which inhibitors or stabilizers such as hydroquinone may be present. It is within the scope of the invention in order to obtain modified characteristics to utilize one or more of the said starting materials with other unsaturated monomers such as unsaturated hydrocarbons or unsaturated esters.

The catalysts which I have found to be suitable for use in the present invention are non-polymerizing organic hydroperoxides having a formula in which the atoms directly linked to the carbon atom bearing the hydroperoxide radical are selected from the group consisting of carbon, hydrogen, nitrogen or oxygen and in such cases where all of said directly linked atoms are carbon, not more than two of said carbon atoms comprise the carbon atom of a methyl group.

I have found that hydroperoxide catalysts coming within the scope of the above formula are latent initiators of polymerization of the monomers named above inasmuch as the mixture thereof with the monomer is highly sensitive to the presence of oxygen and the catalyst remains ineffective to polymerize the monomer in the presence of oxygen, but the catalyst will initiate polymerization of the said monomer in the absence of oxygen.

Certain of the catalysts coming within the scope of the above formula are available commercially. Other of the catalysts may be readily prepared, for example, by taking compounds which can be converted into such hydroperoxides by oxygenation in the liquid phase, notably ethers, ketones and hydrocarbons and simply exposing them in the liquid phase to the oxygen or air or other hydrogen containing gas. Oxygenation may be accelerated by agitation or by introducing the oxygen or air or other oxygen containing gas as a stream beneath the surface of the liquid organic compound being oxygenated. The presence of the active oxygen may be determined by the usual iodine test, i.e., the liberation of iodine from potassium iodide. The percentage of active oxygen present may be measured by heating a sample of the catalyst in a saturated aqueous solution of potassium iodide and thereafter titrating the warm solution with 0.1 N sodium thiosulfate until the color of iodine disappears, the percentage of active oxygen being then calculated by multiplying the number of ccs. of sodium thiosulfate by 0.08 and dividing by the weight of the sample. Specific catalysts which are representative of the class of catalyst compounds which come within the purview of my invention are dimethyl benzyl hydroperoxide (cumene hydroperoxide), methyl ethyl ketone hydroperoxide, and hydroperoxides formed by oxygenation in the liquid phase of the following compounds: methyl butene, cetane, cyclohexene, ethylether, ethylene glycol diethyl ether, diethylene glycol dimethyl ether, tetraethylene glycol dimethyl ether, diethylene glycol, polypropylene glycol, ortho formate, trimethyl ortho formate, acetal, tetraethoxy propane, dioxane, paraldehyde, acetyl acetone, methyl n-hexyl ketone, methyl n-amyl ketone, isopropyl ketone, tetralin and tetra hydrocarbazol.

The amount of catalyst preferably employed will vary depending upon the particular catalyst selected and its degree of oxygenation, i.e. its percentage of active oxygen, and will also depend on whether there is an accelerator present and whether the setting of the resin is to be accomplished at room temperature or at an elevated temperature. In general, the amount of catalyst required to cause polymerization in the absence of air within a reasonable time may be as little as 0.1% by volume of starting material for catalysts having a high percentage of active oxygen. In general, even in the case of only partially oxygenated catalysts having a relatively low percentage of active oxygen, additions in excess of about 20% have no additional beneficial effect and, in fact, will generally be undesirable from the standpoint of dilution of the product and increasing the cost thereof. In general, it will be preferred to utilize a range of 2 to 10% of a catalyst having an active oxygen content of at least 0.1%, since such intermediate range combines the advantages of reasonably rapid polymerization when air is excluded together with an economy of material and a product of preferred characteristics.

In accordance with the invention, I have discovered that it is possible to use smaller amounts of catalyst or catalysts which have a lesser percentage of oxygenation by the use of an accelerator of the type conventionally used in the polyester resin art. By way of example, these include organic amines such as tertiary amines including triethylamine, organic phosphites, organic mercaptans, ascorbic acid, quaternary ammonium salts and the like. The amount of accelerator which may be added may vary over a wide range. In general, there is a beneficial effect with even a fraction of a percent of accelerator present and this may be increased to 10% or more based on the volume of starting material. In general, the beneficial effects obtained will not warrant using more than about 10% of accelerator particularly since the accelerator will act as a diluent. If desired, instead of admixing the accelerator with the sealant, the accelerator may be applied separately, preferably as a pretreatment, to the surfaces to be bonded. Such a pretreatment step with an accelerator is particularly advantageous for promoting the bonding of the sealant composition with zinc and cadmium surfaces.

It is an advantage of the invention that the foregoing ingredients may be added together merely by mixing the same at room temperature. Preferably, the catalyst and also the accelerator, if the same is used, are added to the selected monomer in a mixing device so as to adequately disperse the same throughout. The mixture may be placed in properly shaped closed containers for transportation and storage without danger of polymerization for long periods of time, providing sufficient air space is present. When the resulting mixture is to be used, it is merely applied to the surfaces to be joined or bonded together and polymerization will occur rapidly wherever air is excluded. When used with threaded connections, for example, the composition may be applied to the threads before the threaded members are joined or, since the mixture is a non-viscous liquid, the same will penetrate between the threaded members by capillary action. The same property permits the material to be applied to cracks or small openings in castings, etc. where it is desired to seal the same. Polymerization may be accelerated by the application of heat or by selecting the catalyst and amount thereof, the application of heat can be omitted and rapid polymerization will take place at ordinary room temperature.

As a matter of convenience, the polymerization of the starting material which it is desired to accomplish anaerobically may be measured by the ability of the material to lock together two plates of glass or metal, or a plate of glass and a plate of metal. In the specific examples given hereinafter the glass plates or slides used are 1-inch wide while the metal plates or strips are ⅜-inch wide. A few drops of the mixture may be applied to one of the plates and then the other plate is placed thereon, preferably at right angles to form a square overlap. When it is possible to move the two plates as a unit by manipulating one of the plates, it is evident that polymerization has occurred. In general, such a degree of polymerization within a period of not more than approximately one hour is considered satisfactory for most purposes, although it will be appreciated that in some applications, such as in the locking of bolts and screws of apparatus which is not intended to be used immediately, much longer periods are permissible. On the other hand, it is possible by suitable variation of the addition agents to accomplish polymerization in as short a time as a few minutes or less.

In order that the invention may be more fully understood, the following specific examples are given by way of illustration but without limitation of the practice of the invention. In each example, unless otherwise specified, the parts given are by volume.

Example 1

Various amounts in the range of 0.1 to 10% of a commercial grade of cumene hydroperoxide were added to a commercial grade of tetraethylene glycol dimethacrylate. In each instance, the mixture remained liquid while exposed to air. Some of the samples stored in stoppered bottles half full remained liquid for a year or more when stored at room temperature. However, a few drops of the 10% mixture placed between steel plates at 25–27° C. locked the plates together in forty minutes and a few drops of the 0.1% mixture placed between steel plates locked the plates together in five hours at room temperature. A few drops of the 0.1% mixture placed between glass slides and heated to 100° C. over a steam bath locked the slides together in five minutes.

The following table shows the effect of variations in concentration of catalyst on the time required to convert the monomer to solid resin when excluded from air. Repeated tests were carried out using varying concentrations of commercially pure cumene hydroperoxide with tetraethylene glycol dimethacrylate and the "set time" was measured as the time required to bond together two steel plates at 25–27° C. sufficient to permit the plates to be spun as a unit.

| Test No. | Set time in minutes | | | |
|---|---|---|---|---|
| | 10% catalyst | 5% catalyst | 2½% catalyst | 1¼% catalyst |
| 1 | 30 | 30 | 90 | 60 |
| 2 | 60 | 60 | 40 | 60 |
| 3 | 30 | 60 | 60 | 120 |
| 4 | 30 | 60 | 60 | 60 |
| 5 | 60 | | 120 | 120 |
| Average | 42 | 52 | 74 | 84 |

Some variation in test results was probably due to variation in the surfaces of the steel plates used in determining the set time. However, it is clearly indicated that a reduction in set time results with the use of increased amounts of catalyst but on a diminishing scale as the total amount of catalyst present increases.

Example 2

In this example, the hydroperoxide catalyst was formed by oxygenating cyclohexene by exposure to air to a titre of 3.2% active oxygen. Mixtures were formed containing 10%, 5% and 2½%, respectively, of this catalyst and a commercial grade of tetraethylene glycol dimethacrylate. In each case, the mixture remained liquid when contained in a sealed bottle having some air content. The 10% mixture when applied between crossed steel strips caused firm adherence of the strips at room temperature in an average time of slightly less than three minutes. The 5% mixture when applied in a similar manner caused adherence at room temperature in an average time of slightly less than six minutes. The 2½% mixture when similarly tested set at an average time of slightly less than twenty minutes.

Example 3

As a further example, a hydroperoxide catalyst was formed by oxygenating cetane by exposure to air and then the catalyst was mixed with tetraethylene glycol dimethacrylate in amounts of 10% and 5%. The resulting mixtures remained liquid while in contact with air. When steel strips were wetted with the mixture and crossed, setting took place in one hour at room temperature using the 10% mixture and in three hours using the 5% mixture.

Example 4

To a commercial grade of tetraethylene glycol dimethacrylate was added 20% of a hydroperoxide catalyst formed from 2 methyl butene 1 which had been oxygenated by standing exposed to air to a titre of .08% active oxygen. The resulting mixture remained liquid while exposed to air but a few drops between steel strips locked the slides together at room temperature in 10 minutes. This test was repeated using 10% of hydroperoxide catalyst formed by 2 methyl butene 1 which had been oxygenated to an active oxygen content of 3.8% by standing several years in contact with air. A few drops between glass slides locked the slides together over a steam bath in one minute. Steel plates were locked together at room temperature in ten minutes. Comparable results were obtained by using oxygenated 2 methyl butene 2 as the catalyst. In all cases, samples of the catalyzed monomer stored in stoppered, partially filled bottles were still liquid after several months at room temperature.

Example 5

In this example, there was added to a commercial grade of tetraethylene glycol dimethacrylate, 10% of a hydroperoxide catalyst prepared by exposing ethyl ether to pure oxygen in sunlight for several days and which when tested by the procedure set forth above showed an active oxygen content of 2.7%. A portion of the mixture placed in a covered bottle remained liquid for many months. A few drops placed between steel plates locked the plates together in a few hours time at room temperature. Furthermore, a few drops placed between glass slides and heated over a steam bath, locked the glass slides together in five minutes.

Example 6

Samples of tetraethylene glycol dimethacrylate were mixed, respectively, with a hydroperoxide catalyst formed by oxygenating ethylene glycol diethylether to an active oxygen content of 3.06%, with a hydroperoxide catalyst formed by oxygenating diethylene glycol to an active oxygen content of 3.1% and with a hydroperoxide catalyst formed by oxygenating tetraethoxy propane to an active oxygen content of 2.34% in amounts of 1.25, 2.5, 5 and 10%. These mixtures when stored in covered bottles, remained liquid for several months. A few drops placed between steel plates locked the plates together in a few hours time at room temperature. Furthermore, when crossed glass slides were wetted with each of the mixtures and heated to 100° C. over a steam bath, the slides adhered in three minutes or less in each case.

Example 7

To illustrate the effectiveness of the use of the hydroperoxide catalysts of the present invention even when the catalysts contain a small percentage of active oxygen, samples of tetraethylene glycol dimethylacrylate were mixed respectively with 10% of oxygenated polypropylene glycol having an active oxygen content of .68% and 20% of oxygenated paraldehyde having an active oxygen content of .36%. These mixtures when stored in covered bottles remained liquid for many months. A few drops placed between steel plates locked the plates together in a few hours time at room temperature. When a few drops were placed between crossed glass slides and heated to 100° C. over a steam bath, the slides adhered in one minute.

Example 8

In this example, a ketone hydroperoxide catalyst was prepared by passing a slow steady stream of air through methyl isopropyl ketone while maintaining the methyl isopropyl ketone at a temperature of 45° C. during the aeration period which was 48 hours. At the end of this period the oxygenated methyl isopropyl ketone was tested for the presence of active oxygen in accordance with the procedure set forth above and was found to have a titre of .09 cc. 0.1 N sodium thiosulfate or active oxygen content of 1.44%. Various percentages of the catalyst were mixed with a commercial grade of tetraethylene glycol dimethacrylate and allowed to stand in covered bottles (with some air present) for many months without any solidification taking place. When a few drops of the various mixtures were placed between steel plates and allowed to stand at room temperature, locking of the plates occurred on the average as follows:

| Percent of catalyst: | Average set time, minutes |
|---|---|
| 2.5 | 16 |
| 5 | 10 |
| 10 | 6 |

Example 9

In this example, a di-ketone hydroperoxide catalyst was prepared by passing a slow steady stream of air through acetyl acetone while maintaining the acetyl acetone at a temperature of 50° C. during an aeration period of 48 hours. At the end of this time, the oxygenated acetyl acetone was tested and found to have a titre of 0.5 cc. 0.2 N sodium thiosulfate or active oxygen content of .064% oxygen. Various amounts of the catalyst were mixed with tetraethylene glycol dimethacrylate and tested as in Example 10 by wetting the facing surfaces of two steel plates with the mixture and recording the time required for the mixture to "set" and form a bond between the plates at room temperaure. The average set time for various mixtures was as follows:

| Percent of catalyst: | Average set time, minutes |
|---|---|
| 5 | 10 |
| 10 | 7 |

These same mixtures when set aside in closed bottles (with some air present) were still liquid after several months.

Example 10

As a further illustration of the effectiveness of ketone hydroperoxide catalysts in small amounts, tetraethylene glycol dimethacrylate was mixed with various percentages of a commercial grade of methyl ethyl ketone hydroperoxide having an active oxygen content of 9.6%. A few drops of a mixture of the monomer with 2½% methyl ethyl ketone hydroperoxide between steel plates at room temperature had an average set time of 45 minutes. Between glass plates and heated over a steam bath (100° C.) the average set time was 23 seconds. Similar tests with 5% and 10% of the methyl ethyl ketone hydroperoxide showed no significant change in the average set time. A mixture containing only 0.625% methyl ethyl ketone hydroperoxide when tested with glass slides over a steam bath had an average set time of 3½ minutes.

Example 11

In this example, tetra hydronaphthalene (tetralin) was oxygenated by passing air therethrough for three days at 70° C. to form tetra hydronaphthalene hydroperoxide. A mixture was prepared with 5% of this hydroperoxide and tetraethylene glycol dimethacrylate. This mixture in contact with air remained liquid for several months. A few drops placed between metal strips set up in approximately two to three minutes at room temperature.

Example 12

Tetra hydrocarbazol hydroperoxide in crystalline form was prepared by bubbling air through a hot solution of tetra hydrocarbazol in light naphtha for a few hours. The hydroperoxide precipitated from solution as crystals. A saturated methanol solution of the hydroperoxide was then added to tetraethylene glycol dimethacrylate in the amount of 7%. A sample of the mixture in contact with air was still liquid after several months. A few drops placed between metal strips locked the strips together in five minutes.

Example 13

Conventional accelerators such as triethylamine were added in amounts ranging from 1 to 10% to the monomer and catalyst mixtures of the foregoing examples. In each case, there was no noticeable reduction in shelf life, i.e., the ability of the mixture to remain liquid over long periods of time even when stored in covered, partially-filled containers. However, when the mixture containing the accelerator was placed between crossed slides, the time required to produce locking of the slides was reduced. Conversely, the amount of catalyst required to produce a desired set time was decreased with accelerator present.

The following is a table of various representative tests performed with different mixtures of catalysts and accelerators. The monomer in each case was tetraethylene glycol dimethacrylate and the "set time" was the time required for crossed steel strips wetted with the mixture to adhere at room temperature.

| Catalyst | Accelerator | Set time |
|---|---|---|
| 2½% catalyst "A" | None | 100 minutes. |
| 2% catalyst "A" | 2% triethanolamine | 30 minutes. |
| Do | 2% dimethylaniline | 18 minutes. |
| 5% catalyst "A" | None | 50 minutes. |
| Do | 1% triethylamine | 30 minutes. |
| Do | 2% triethylamine | 15 minutes. |
| Do | 3% triethylamine | 17 minutes. |
| Do | 5% triethylamine | 30 minutes. |
| 7% catalyst "A" | 2% triethylamine | 9 minutes. |
| 10% catalyst "A" | None | 40 minutes. |
| Do | 1% triethylamine | 70 minutes. |
| Do | 2% triethylamine | 12 minutes. |
| Do | 10% triethylamine | 60 minutes. |
| 5% catalyst "B" | None | 18.3 minutes. |
| Do | 2% dimethylaniline | 18.0 minutes. |
| Do | 3% dimethylaniline | 15.0 minutes. |
| Do | 4% dimethylaniline | 3.0 minutes. |
| Do | 2% tertiary ethylamine | 16.5 minutes. |
| Do | 3% tertiary ethylamine | 4.5 minutes. |
| 5% catalyst "C" | None | 25.7 seconds. |
| Do | 3% triethylamine | 22.9 seconds. |
| 2½% catalyst "C" | 2½% dimethylaniline | 18.0 seconds. |
| 2½% catalyst "D" | None | 80 minutes. |
| Do | 2% triethylamine | 15 minutes. |
| 5% catalyst "D" | None | 35 minutes. |
| Do | 2% triethylamine | 10 minutes. |
| 2½% catalyst "E" | None | 30 minutes. |
| Do | 2% triethylamine | 15 minutes. |

In the above tests, catalyst "A" was cumene hydroperoxide; catalyst "B" was a hydroperoxide formed by oxygenating ethylene glycol diethyl ether (active oxygen content 3.7%); catalyst "C" was methyl ethyl ketone hydroperoxide; catalyst "D" was a hydroperoxide formed by passing air through methyl m-hexyl ketone at a temperature of 50° C. until a test sample was found to have an active oxygen content of .18%; and catalyst "E" was a hydroperoxide formed by passing a stream of air through methyl n-amyl ketone until an active oxygen content of 1% was found to be present.

Example 14

To illustrate the unexpectedness of the results obtained by the present invention, a few drops of commercial grade of tetraethylene glycol dimethacrylate without any catalyst was placed between steel plates and allowed to stand at room temperature for one week without observing any bonding action. When samples of the tetraethylene glycol dimethacrylate were tested with varying quantities of the conventional catalyst, benzoyl peroxide, in amounts varying from 2½ to 10%, polymerization occurred on storage in contact with air in a few hours to a day in each case, thus showing a lack of the air sensitivity and practical shelf life which is characteristic of the use of the catalysts of my invention. Other conventional peroxidic polymerization catalysts, including tertiary butyl perbenzoate and ditertiary butyl diperphthalate were tried with the same result in that no case was a useful degree of anaerobic curing characteristic demonstrated.

Example 15

For simplicity and brevity of presentation, the method of the present invention has been illustrated by the use of tetraethylene glycol dimethacrylate which is readily available commercially. Comparable results are obtained by the use of diethylene glycol dimethacrylate, triethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di(chloroacrylate), diglycerol diacrylate, diglycerol tetramethacrylate, etc.

The monomer-catalyst sealant mixtures of the present invention are non-volatile and may be made up in varying viscosities depending upon the monomer and catalyst selected and whether or not thickening agents are added. For use in bonding closely fitting surfaces or for application to previously assembled parts where it is desired to have the sealant penetrate between the mating surfaces, a thin liquid of low viscosity having good capillary action characteristics is preferred. For sealing or bonding loose fitting surfaces where there are relatively large spaces or voids to be filled, it generally is preferred to select a sealant mixture which is relatively viscous.

As previously mentioned, the monomer-catalyst sealant mixtures of the present invention may be applied in relatively small amounts, usually only a drop or two, to the surfaces to be joined either prior or subsequent to joining. In general it is preferred to degrease the surfaces to be joined prior to application of the sealant. In the absence of air, the sealant sets up without appreciable shrinkage to a strong solid resin which is resistant to chemical attack, heat aging and solvent action. Among the surfaces which appear to be most effectively bonded by the sealant of the present invention are glass, ceramic and metal surfaces and combinations thereof. The shear strength of the bond between metal surfaces is frequently as great or greater than that of the metal itself and when treating softer metals such as aluminum fasteners it may be desired to reduce the shear strength of the bond by the use of suitable addition agents.

When the parts to be treated with sealant are already assembled or joined, the liquid sealant applied thereto will penetrate between the adjoining surfaces by capillary action following which the sealant between the surfaces will rapidly polymerize to a solid resin bond because of the absence of air. Any excess sealant which is not between the surfaces and thus remains exposed to air will remain liquid and can easily be wiped off. When the liquid sealant is applied to the parts prior to assembly or joining, the liquid sealant coating remains exposed to air and thus will remain liquid until the parts are assembled and joined whereupon the air between the mating surfaces is excluded and causes a solid bond to form between the surfaces. This characteristic is particularly advantageous in the case of fasteners used in large quantities, particularly threaded fasteners such as nuts and bolts, where it may be desirable to apply sealant to large batches or quantities of the parts in advance instead of treating each part individually just prior to assembly.

There is a marked catalytic or accelerating effect on the cure of the monomer-catalyst sealant mixtures of the present invention by most metals and hence it is desirable in order to have maximum shelf life to avoid the use of metals in the manufacturing and storage of the mixture. Glass or plastic containers are preferred for storing the mixture. Also it is desirable to avoid storage of the mixture in direct sunlight since this also will accelerate curing and reduce shelf life. The effect of sunlight can be minimized by the use of colored translucent or opaque containers.

While most metals have a catalytic or accelerating effect on the cure of the sealant, certain metals, notably cadmium and zinc, do not have such an effect and thus when applying the sealants to surfaces of cadmium and zinc it is preferred to pretreat these surfaces with a heavy metal compound which is soluble in the monomer-catalyst mixture such as ferric chloride, and cobalt, manganese, lead, copper and iron "soaps" such as cobalt 2 ethyl hexoate, cobalt 2 ethyl butyrate, cobalt naphthanate, cobalt laurate, manganese 2 ethyl hexoate, manganese 2 ethyl butyrate, manganese naphthanate, manganese laurate, lead 2 ethyl hexoate, lead 2 ethyl butyrate, lead naphthanate, lead laurate, etc. and mixtures thereof. These heavy metal compounds may be readily applied to the surfaces, for example, by wetting the surfaces with a dilute solution of the heavy metal compound in a volatile solvent such as trichlorethylene and then permitting the solvent to evaporate. Cadmium and zinc surfaces so treated can be bonded together with the sealants of the present invention as quickly as any other metals.

It will be apparent and understood that various modifications and equivalents coming within the realm of my discoveries may be used and I intend to include these within the scope of the appended claims defining my invention.

I claim:

1. A sealant composition having an extended shelf life when exposed to oxygen but capable of setting up in a relatively brief time when excluded from contact with oxygen comprising a mixture of an unoxygenated monomer corresponding to the general formula:

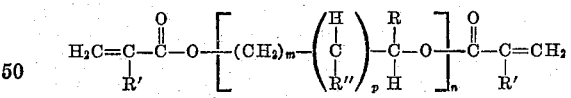

where R is a member selected from the class consisting of hydrogen, —CH$_3$, —C$_2$H$_5$, —CH$_2$OH,

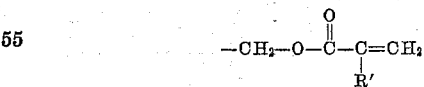

R' is a member selected from the class consisting of hydrogen, chlorine, —CH$_3$, and —C$_2$H$_5$, R" is a member selected from the class consisting of hydrogen, —OH, and

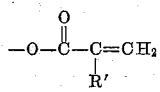

m is an integer equal to at least 1, n is an integer equal to at least 2, and p in one of the following: 0, 1 and a minor amount, less than 20%, sufficient to polymerize said monomer within a maximum period of about five hours upon the exclusion of oxygen, of a latent initiator of polymerization consisting essentially of a non-polymerizing organic hydroperoxide having a formula in which the atoms directly linked to the carbon atom bearing the hydroperoxide radical are selected from the group consisting of carbon, hydrogen and oxygen, and in such cases where all of said directly linked atoms are carbon, not more than two of said carbon atoms comprise the carbon atom of a methyl group, said hydroperoxide being characterized by its ability to remain ineffective to polymerize said monomer in the presence of oxygen and to initiate polymerization of said monomer in the absence of oxygen at room temperature.

2. The sealant composition of claim 1 wherein the hydroperoxide comprises a hydroperoxide of a hydrocarbon.

3. The sealant composition of claim 1 wherein the hydroperoxide comprises a hydroperoxide of an ether.

4. The sealant composition of claim 1 wherein the hydroperoxide comprises a hydroperoxide of a ketone.

5. The sealant composition of claim 1 wherein at least one of the atoms directly linked to the carbon bearing the hydroperoxide radical is carbon.

6. The sealant composition of claim 1 wherein at least one of the atoms directly linked to the carbon bearing the hydroperoxide radical is hydrogen.

7. The sealant composition of claim 1 wherein at least one of the atoms directly linked to the carbon bearing the hydroperoxide radical is oxygen.

8. A liquid composition having an extended shelf life to remain liquid for an extended period of time when exposed to oxygen but capable of setting up in a relatively brief time when excluded from contact with oxygen comprising a mixture of an unoxygenated monomer corresponding to the general formula:

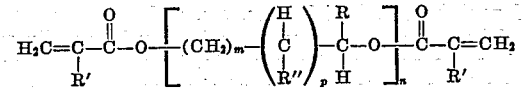

where R is a member selected from the class consisting of hydrogen, —CH$_3$, —C$_2$H$_5$, —CH$_2$OH,

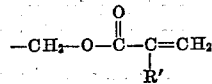

R' is a member selected from the class consisting of hydrogen, chlorine, —CH$_3$, and —C$_2$H$_5$, R" is a member selected from the class consisting of hydrogen, —OH, and

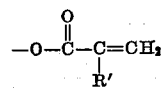

$m$ is an integer equal to at least 1, $n$ is an integer equal to at least 2, and $p$ is one of the following: 0, 1 and 0.1% to 20%, sufficient to polymerize said monomer within a maximum period of about five hours upon the exclusion of oxygen, of a latent initiator of polymerization consisting essentially of a non-polymerizing organic hydroperoxide having a formula in which the atoms directly linked to the carbon atom bearing the hydroperoxide radical are selected from the group consisting of carbon, hydrogen and oxygen, and in such cases where all of said directly linked atoms are carbon, not more than two of said carbon atoms comprise the carbon atom of a methyl group, said hydroperoxide being characterized by its ability to remain ineffective to polymerize said monomer in the presence of oxygen and to initiate polymerization of said monomer in the absence of oxygen at room temperature.

9. The sealant composition of claim 1 wherein the monomer comprises tetraethylene glycol dimethacrylate.

10. The sealant composition of claim 1 wherein the hydroperoxide comprises cumene hydroperoxide.

11. The sealant composition of claim 1 wherein the hydroperoxide comprises cyclohexene hydroperoxide.

12. The sealant composition of claim 1 wherein the hydroperoxide comprises cetane hydroperoxide.

13. The sealant composition of claim 1 wherein the hydroperoxide comprises 2 methyl butene 1 hydroperoxide.

14. The sealant composition of claim 1 wherein the hydroperoxide comprises ethyl ether hydroperoxide.

15. The sealant composition of claim 1 wherein the hydroperoxide comprises ethylene glycol diethyl ether hydroperoxide.

16. The sealant composition of claim 1 wherein the hydroperoxide comprises diethylene glycol hydroperoxide.

17. The sealant composition of claim 1 wherein the hydroperoxide comprises tetraethoxy propane hydroperoxide.

18. The sealant composition of claim 1 wherein the hydroperoxide comprises polypropylene glycol hydroperoxide.

19. The sealant composition of claim 1 wherein the hydroperoxide comprises paraldehyde hydroperoxide.

20. The sealant composition of claim 1 wherein the hydroperoxide comprises methyl isopropyl ketone hydroperoxide.

21. The sealant composition of claim 1 wherein the hydroperoxide comprises acetyl acetone hydroperoxide.

22. The sealant composition of claim 1 wherein the hydroperoxide comprises methyl ethyl ketone hydroperoxide.

23. The sealant composition of claim 1 wherein the hydroperoxide comprises tetra hydronaphthalene hydroperoxide.

24. The sealant composition of claim 1 wherein the hydroperoxide comprises tetra hydrocarbazol hydroperoxide.

25. The sealant composition of claim 1 wherein the hydroperoxide comprises methyl n-amyl ketone hydroperoxide.

26. The sealant composition of claim 1 wherein the hydroperoxide comprises methyl n-hexyl ketone hydroperoxide.

27. The sealant composition of claim 1 including from about one percent to about ten percent by weight of an accelerator of polymerization which does not materially shorten the shelf life of the composition in the presence of oxygen.

References Cited in the file of this patent
UNITED STATES PATENTS

| Number | Name | Date |
|---|---|---|
| 2,046,885 | Strain | July 7, 1936 |
| 2,129,667 | Barrett et al. | Sept. 13, 1938 |
| 2,129,685 | Graves | Sept. 13, 1938 |
| 2,129,722 | Woodhouse | Sept. 13, 1938 |
| 2,268,611 | Mitchell | Jan. 6, 1942 |
| 2,389,464 | Snyder | Nov. 20, 1945 |
| 2,444,655 | Kroeker et al. | July 6, 1948 |
| 2,458,888 | Rehberg et al. | Jan. 11, 1949 |
| 2,531,745 | Schopmeyer | Nov. 28, 1950 |
| 2,569,462 | Drake | Oct. 2, 1951 |
| 2,569,481 | Lorand | Oct. 2, 1951 |
| 2,628,178 | Burnett et al. | Feb. 10, 1953 |
| 2,718,485 | Samuely | Sept. 20, 1955 |
| 2,719,132 | Schweitzer | Sept. 27, 1955 |
| 2,750,320 | Latham | June 12, 1956 |